INVENTORS
TOM HUTSON, JR.
C. O. CARTER
BY
*Young & Quigg*
ATTORNEYS

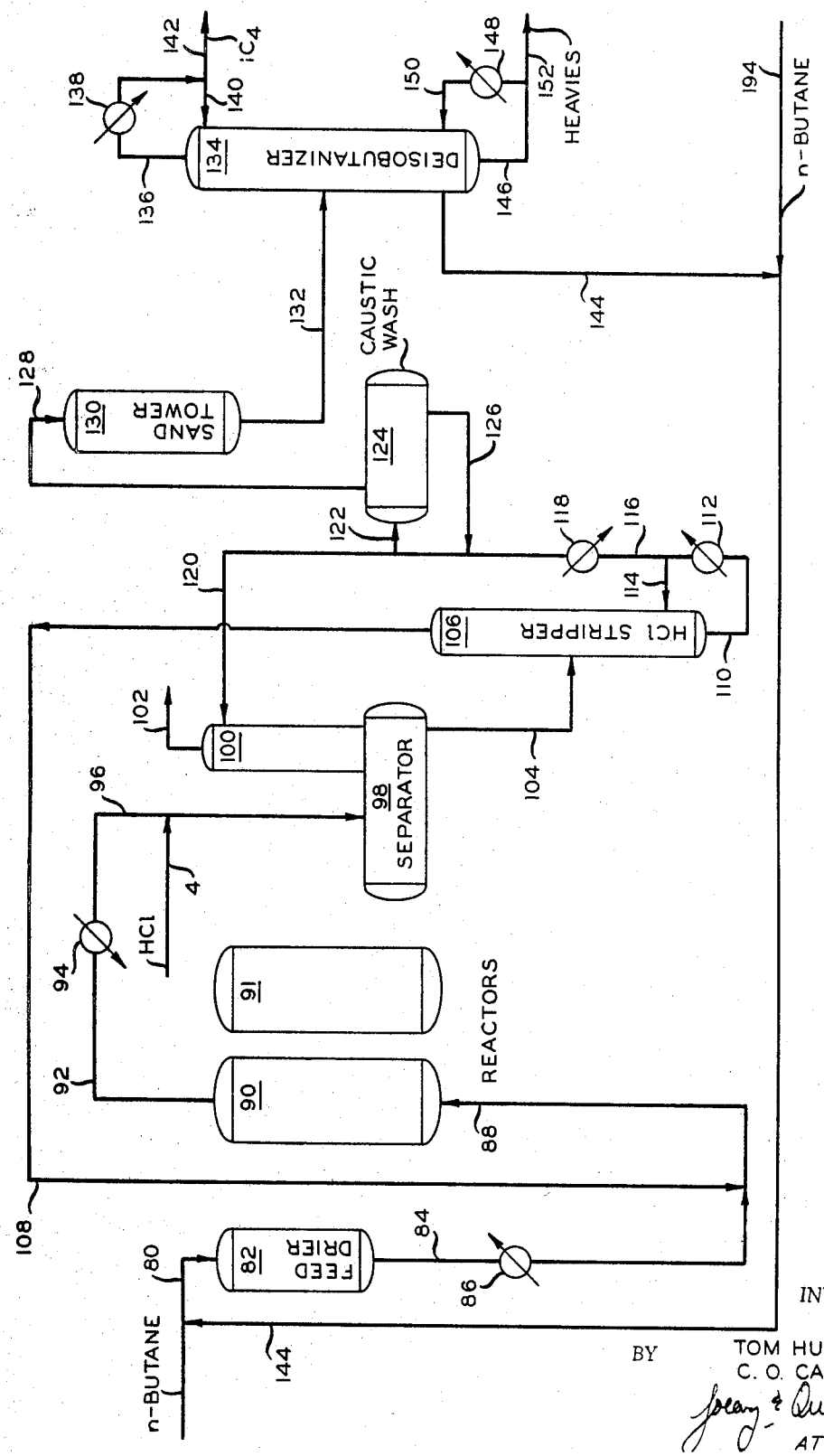

INVENTORS
TOM HUTSON, JR.
C. O. CARTER
ATTORNEYS

United States Patent Office 3,476,825
Patented Nov. 4, 1969

3,476,825
FORMATION AND REGENERATION OF
CATALYST IN AN ALKYLATION AND
ISOMERIZATION PROCESS
Thomas Hutson, Jr., and Cecil O. Carter, Bartlesville, Okla., assignors to Phillips Petroleum Company, a corporation of Delaware
Filed Mar. 3, 1967, Ser. No. 620,508
Int. Cl. C07c 3/54, 9/12
U.S. Cl. 260—683.53          7 Claims

ABSTRACT OF THE DISCLOSURE

An alkylation process wherein $AlCl_3$ catalyst is formed in situ, excess catalyst is used in a hydrocarbon isomerization process, the isomerized hydrocarbon is used in the alkylation process, and spent catalyst from the process is regenerated with the use of hydrogen formed in situ in the alkylation process.

---

Figure 1:
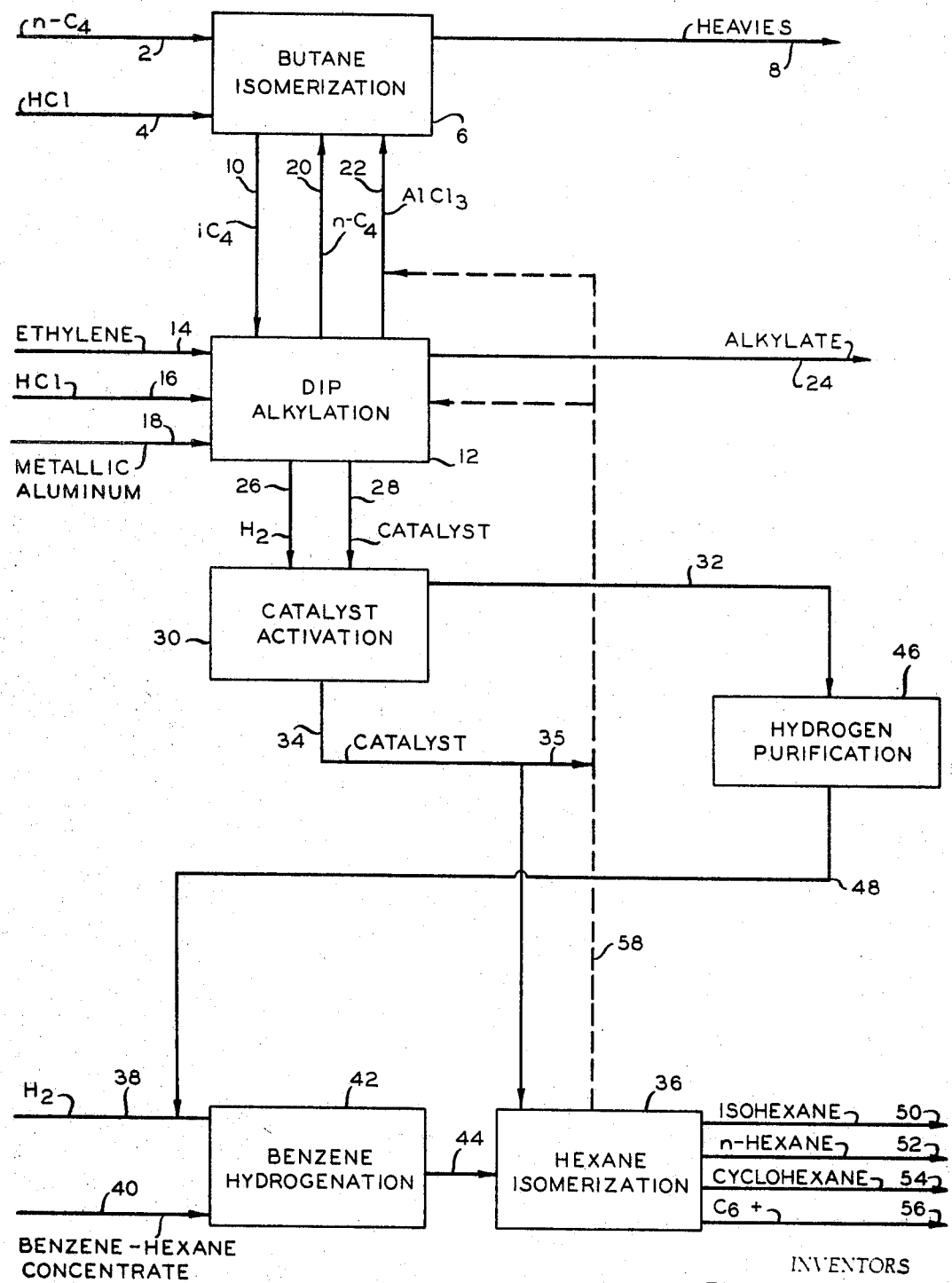

This invention relates to a hydrocarbon conversion process. In one of its aspects, it relates to an alkylation process wherein an alkylation catalyst is formed in situ, the excess catalyst formed is used in an isomerization reaction in which the hydrocarbon is isomerized and the isomerized hydrocarbon is used in the alkylation process, and the spent catalyst from the alkylation process is regenerated with the use of hydrogen formed in situ in the alkylation process.

Diisopropyl or 2,3-dimethylbutane is becoming increasingly important as a motor fuel due to the fact that it has an unleaded octane number greater than 100. Many processes have been devised for the production of diisopropyl with the use of aluminum chloride catalysts. This catalyst is very expensive and is usually employed on a supported base.

Boynton et al., U.S. 2,847,488, discloses a process in which normal butane is isomerized by passing the same over a bed of supported aluminum chloride, isobutane formed in the isomerization process is separated from normal butane and combined with an olefin stream, which combined stream is alkylated by passing the stream over a bed of supported aluminum chloride catalyst.

Hepp et al., U.S. 2,968,684, discloses and claims a process for the alkylation of ethylene with isobutane using aluminum chloride complex in which the aluminum chloride complex is also used for $C_5$–$C_7$ isomerization in the presence of isobutane.

We have now discovered that the cost of the product, i.e., diisopropyl, can be reduced by forming the catalyst in situ, using the catalyst thus formed for alkylation and isomerization of the hydrocarbon used in the alkylation process and regenerating the catalyst with the use of hydrogen formed as a by-product of the catalyst formation.

By various aspects of this invention, one or more of the following or other objects can be obtained.

It is an object of this invention to provide an improved process of the production of a higher grade motor fuel.

It is a further object of this invention to provide an additional process for the production of diisopropyl wherein the catalyst costs are greatly reduced.

It is a still further object of this invention to provide an integrated process for the production of diisopropyl wherein isohexane, normal hexane and cyclohexane are also produced.

Other aspects, objects and the several advantages of this invention are apparent to one skilled in the art from a study of this disclosure, the drawings and the claims.

According to the invention, there is provided a process for the production of an alkylated hydrocarbon wherein an isomerized hydrocarbon is reacted with an olefin. An aluminum halide catalyst is formed in situ in the alkylation process and the catalyst so formed is used in a hydrocarbon isomerization to produce a hydrocarbon used in the alkylation process. The spent catalyst from the alkylation process is regenerated with the use of hydrogen formed in situ in the alkylation process.

The regenerated catalyst can then be used in a hexane isomerization process or can be recycled to the alkylation or first mentioned isomerization process as desired.

Preferably, isobutane is produced in a first isomerization process and is alkylated with ethylene to produce diisopropyl. The regenerated catalyst is employed in a hexane isomerization process in which the hexane feed is obtained from a hydrogenation process employing the hydrogen off gas from the regenerator.

The common catalyst used in the process according to the invention is an aluminum halide catalyst wherein the halide is selected from the group consisting of chlorine and bromine.

Figure 2B:
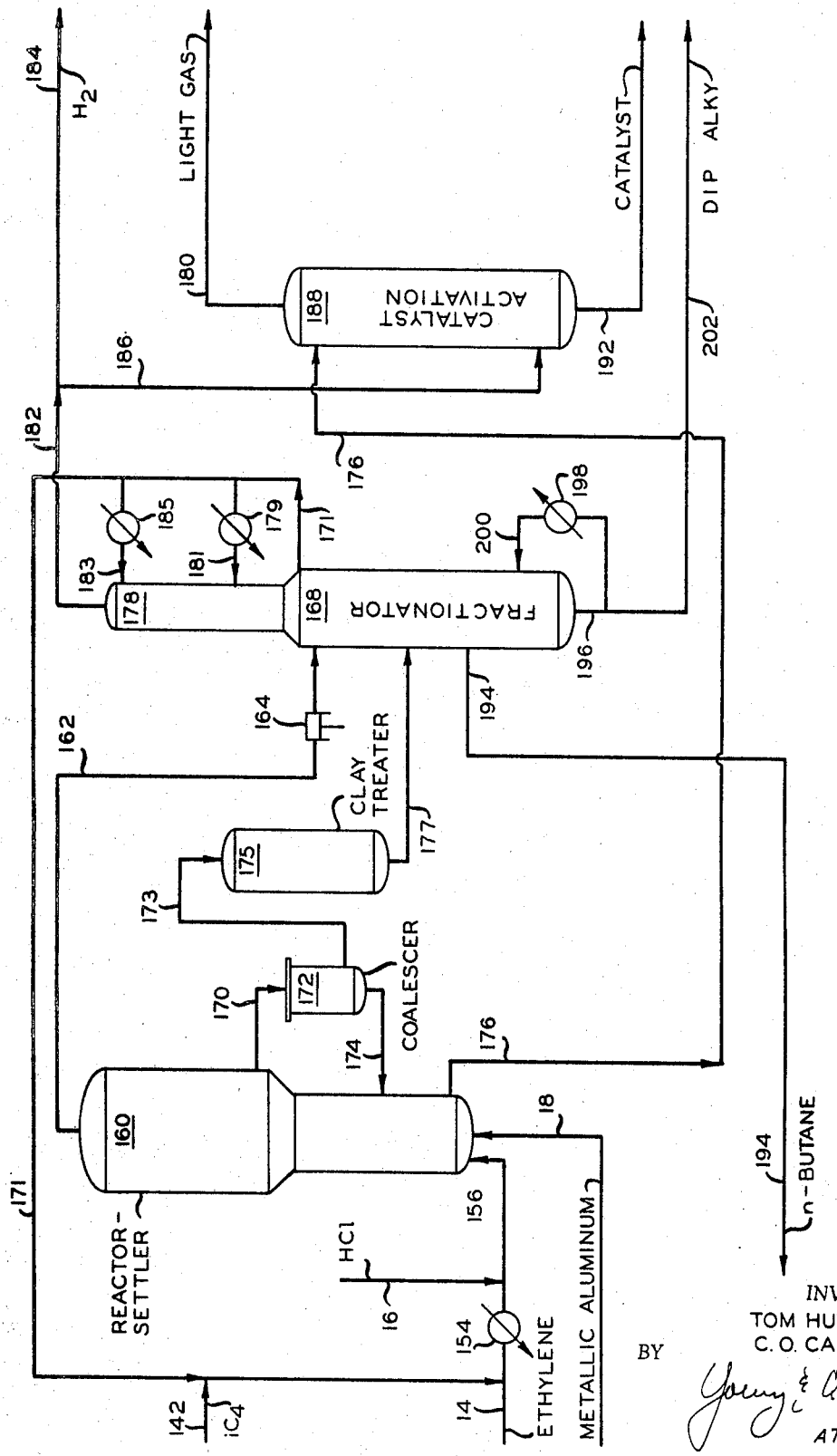
Figure 2C:
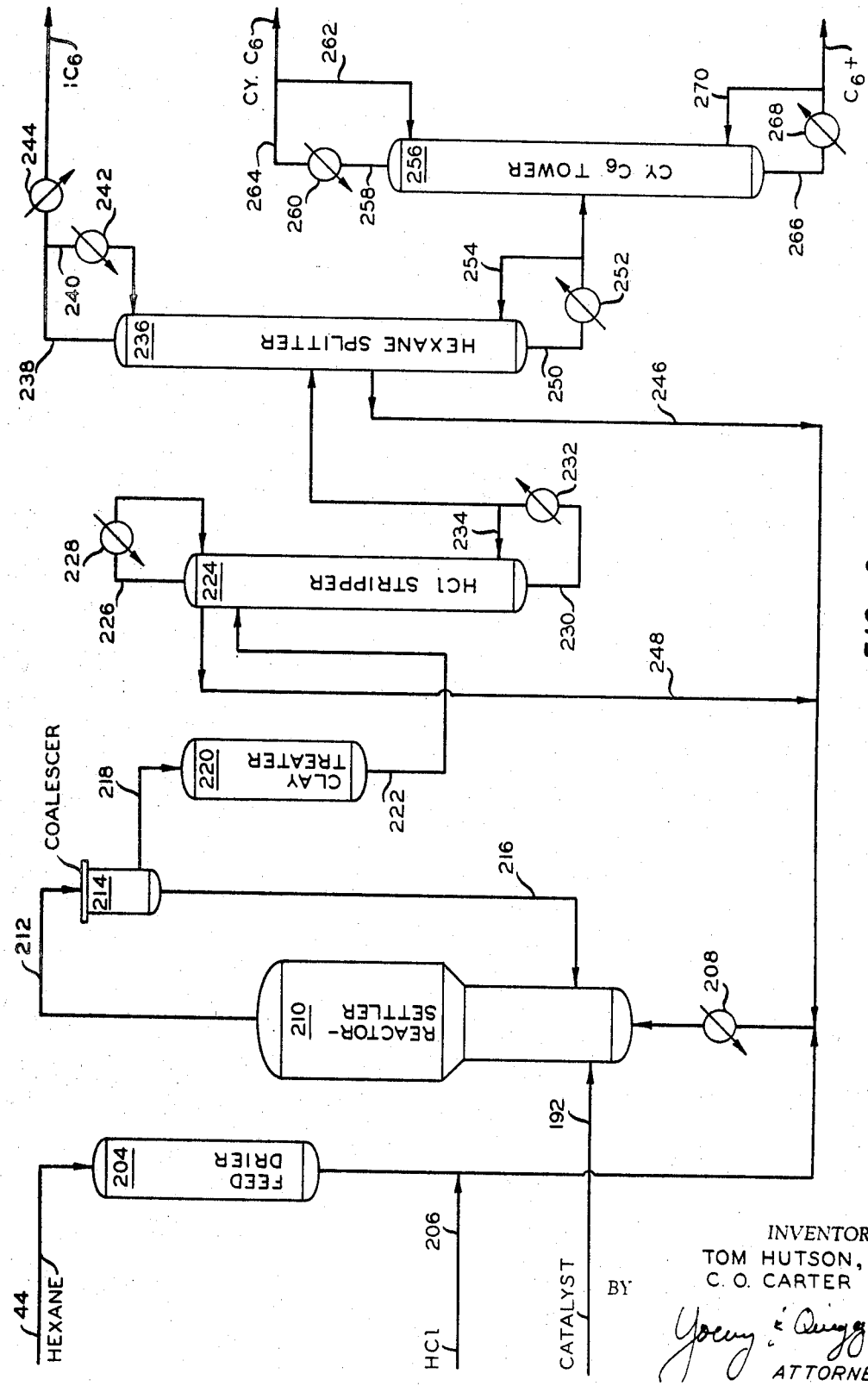
Figure 3:
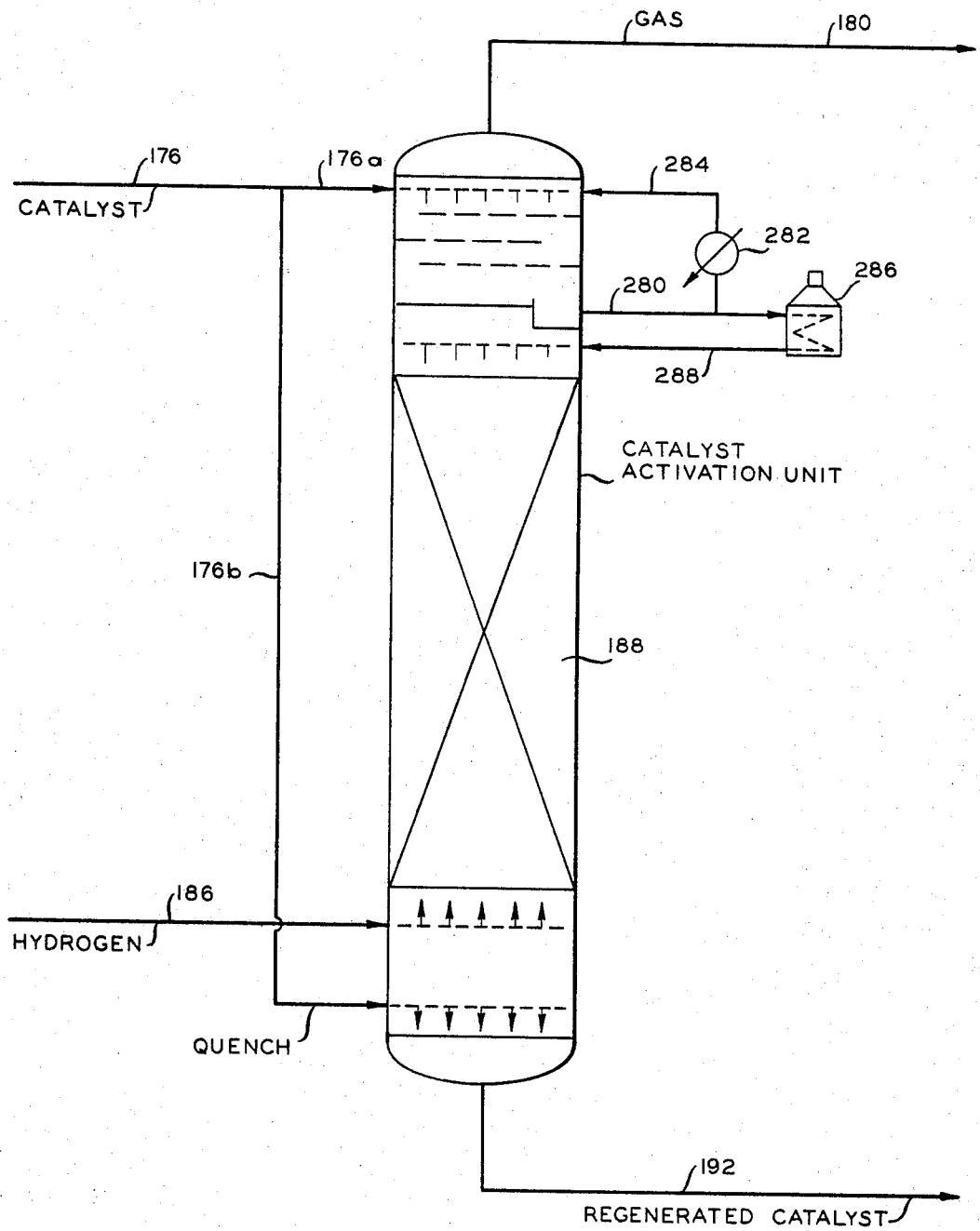

The invention will be described with reference to the accompanying drawings in which FIGURE 1 is a schematic illustration of a process according to the invention. FIGURES 2a, 2b and 2c are more detailed schematic illustrations of the process shown in FIGURE 1, and FIGURE 3 is a more detailed schematic drawing of the regenerator shown in FIGURES 1 and 2.

Referring now to the drawings, and to FIGURE 1 in particular, a normal butane stream 2 and an HCl stream 4 are passed to a butane isomerization zone 6 wherein the normal butane is contacted with an aluminum chloride catalyst entering isomerization zone 6 through line 22. Normal butane also passes into isomerization zone 6 through line 20 as will be hereinafter described. The product isobutane from the isomerization zone 6 is passed through line 10 to an alkylation zone 12 wherein it is alkylated with ethylene entering through line 14. Hydrochloric acid in line 16 and metallic aluminum in line 18 are added to the alkylation reaction zone 12 to thereby form an aluminum chloride catalyst in situ. Heavy products from the butane isomerization zone 6 are removed through line 8. Product alkylate from alkylation zone 12 is removed through line 24. Excess catalyst formed in alkylation zone 12 is passed by line 22 to butane isomerization zone 6. Normal butane in the alkylation zone and entrained with olefin feed is passed through line 20 to isomerization zone 6. Spent catalyst from the alkylation zone 12 is removed through line 28 and passed to a catalyst activation zone 30. The spent catalyst is contacted in activation zone 30 with hydrogen recovered as a product of the in situ formation of the aluminum chloride catalyst in alkylation zone 12. The hydrogen is passed through line 26 to activation zone 30. The activated catalyst from zone 30 is preferably passed through line 34 to a hexane isomerization zone 36 via line 58 wherein a hexane concentrate entering through line 44 is isomerized to produce isohexane, removed through line 50, normal hexane removed through line 52, cyclohexane removed through line 54, and $C_6+$ hydrocarbons which are used as motor fuel removed through line 56.

Alternately, a portion of the activated catalyst is passed through line 35 and can be recycled to the alkylation zone 12 and/or the butane isomerization zone 6 preferably, however, the conditions are such that the activated catalyst contains 60–70 percent aluminum chloride and is thus more suitable ofr the hexane isomerization than the butane isomerization or the alkylation process. Spent catalyst from the hexane isomerization which is considerably lower in aluminum chloride content can be passed through line 58 back to the alkylation zone 12 and/or the butane isomerization zone 6. The off gas from the catalyst activation zone 30 is removed through line 32. Since this gas stream contains a substantial percentage of hydrogen, the same stream can be passed through a hydrogen purification zone 46 through line 48 and to line 38 and used in a benzene hydrogenation zone 42. Benzene hexane concentrate in line 40 is admixed with the hydrogen in line 38 and hydrogenated in benzene hydrogenation zone 42.

Alternately and preferably, hydrogen purification zone 46 can be eliminated and the hydrogen stream 32 can be passed directly to the benzene hydrogenation process. A suitable process for using this low quality hydrogen is disclosed and claimed in Serial No. 394,484, filed September 4, 1964.

Referring now to FIGURE 2a, make-up normal butane in line 80 is passed to feed dryer 82 through line 84 to feed vaporizer and superheater 86 through line 88 to vessel 90 wherein the normal butane is contacted with aluminum chloride supported on a clay bed. The isomeration vessel 90 is preferably maintained at a temperature in the range of 250–310° F. at a pressure of about 225 p.s.i.g. Under these conditions the butane conversion is about 55 percent with a selectivity of about 91 percent. The aluminum chloride used is about .092 pound of aluminum chloride per barrel of feed. Vessels 90, 91 and 175 serve as both the isomerization reactors and the clay treating beds used in this embodiment. While vessel 90 is on stream as a reactor, vessel 91 is on stand by and vessel 175 is on regeneration as a clay treater. In order to simplify the drawings, not all piping to vessels 90, 91 and 175 has been shown.

The isomerized hydrocarbon is passed through line 92 to condenser 94 through line 96 to separator 98. Venting gases are removed through absorber 100 and through line 102. Liquid product is removed from separator 98 through line 104 and passed through HCl stripper 106 wherein HCl is removed through line 108 and recycled to line 88. Butane removed from the bottom of stripper 106 in line 110 is heated in heater 112 and a portion of the bottoms product is recycled to stripper 106 through line 114. The isomerized hydrocarbon in line 116 is cooled in heat exchanger 118 and a portion of the liquid is recycled through line 120 to absorber 100. The other portion of the cooled liquid is passed to caustic wash zone 124 and a portion of the liquid is recycled through line 126. The wash hydrocarbon is removed from wash zone 124 through line 128 and passed to sand tower 130 wherein any caustic entrained in the hydrocarbon is removed. The hydrocarbon is passed through line 132 to deisobutanizer 134 wherein isobutane is removed through line 136, condensed in heat exchanger 138 and returned to the deisobutanizer 134 through line 140. A portion of the condensed isobutane is passed through line 142 to be admixed with ethylene in line 14 as will be hereinafter described. Heavy ends are removed from deisobutanizer 134 in line 146 and a portion thereof is heated in heat exchanger 148 and recycled to the deisobutanizer through line 150. The other portion of the heavies are removed through line 152. Normal butane removed from the deisobutanizer 134 through line 144 is recycled to the isomerization process. Make-up hydrochloric acid for the isomerization process is added through line 4 to line 96.

Referring now to FIGURE 2b, the combined stream of ethylene and isobutane is passed through heat exchanger 154 to temperature condition the feed through line 156 to reactor-settler 160. Also charged to the reactor 160 is hydrochloric acid through line 16 and metallic aluminum through line 18. The process and apparatus for alkylating the hydrocarbon is disclosed in copending application Serial No. 574,611, filed August 24, 1966. In the alkylation section of the reactor 160, the temperature is preferably maintained at about 117° F. The reaction feed temperature is about 94° F., the settler temperature is about 115° F., and the reactor pressure is about 100 p.s.i.g. The mol ratio of isobutane to ethylene is preferably maintained at about 8–10. Unreacted hydrocarbon is removed through line 162 from reactor-settler 160, compressed in compressors 164, passed to fractionator 168. Product alkylate is removed through line 170 and passed to coalescer 172. Aluminum chloride complex, formed in situ in the reactor-settler 160, is removed from the product alkylate in coalescer 172 and returned to the reactor through line 174. Product alkylate, preferably diisopropyl, containing a small amount of aluminum chloride catalyst, is passed through line 173 to vessel 175, shown as a clay treater, wherein final traces of aluminum chloride catalyst are removed. The product, free from catalyst, is passed through line 177 to fractionator 168. In the process of this invention, when vessel 175 has been saturated with aluminum chloride catalyst, it will be regenerated by being switched on stream to line 88 to be used as a butane isomerization reactor. After the aluminum chloride has been depleted from vessel 90, it is switched onto standby as vessel 91 for cooling, at which time vessel 91, depleted of aluminum chloride, is switched into line 173 as a clay treater. This process has been described and claimed in copending Serial No. 440,257, filed March 16, 1965.

A hydrogen stream is removed through absorber 178 in line 182 and a portion thereof can be removed as high purity hydrogen through line 184. Preferably, however, the hydrogen stream is passed through line 186 to catalyst activation unit 188. Isobutane removed from fractionator 168 through line 171 can be cooled in heat exchangers 179 and 185 and returned to the fractionator and absorber through lines 181 and 183, respectively. Alternately, a portion of the isobutane removed can be added to line 142 for recycle via line 171. Normal butane is removed from fractionator 168 through line 194 and is admixed with the normal butane in line 144 for recycle to the isomerization process. Alkylate product is removed from fractionator 168 through line 196. A portion of the alkylate is heated in heat exchanger 198 and returned to the fractionator through line 200. The other portion is removed through line 202 as a product. Spent aluminum chloride complex from the reactor-settler 160 is removed through line 176 and passed through catalyst activation unit 188 wherein it is contacted with hydrogen as will be hereinafter described with reference to FIGURE 3. Hydrogen off-gas containing about 25 percent hydrogen is removed through line 180 and can be used in the hydrogenation of benzene, cyclohexane according to the process described and claimed in copending Serial No. 394,484, filed September 4, 1964. Activated catalyst is removed from the activation unit 188 through line 192 and is passed through hexane isomerization reactor 210 (FIGURE 2c). The reactor 210 is similar to reactor 160 and has been described and claimed in copending application Serial No. 574,611, filed August 24, 1966.

Referring now specifically to FIGURE 2c, hexane concentrate from a benzene hydrogenation process such as produced according to the process disclosed and claimed in copending Serial No. 394,484, filed September 4, 1964, is passed through line 44 to a feed drier 204 and admixed with HCl in line 206. The mixture is temperature conditioned in heat exchanger 208 and passed to isomerization unit 210 wherein the hexane is isomerized to produce isohexane and cyclohexane from normal hexane and methylcyclopentane, respectively. Preferably, the conditions in the hexane isomerization reactor-settler 210 include a reactor temperature of about 160° F., a feed temperature of about 78° F., a weight ratio of aluminum chloride to feed of 0.75–0.85 and a weight ratio of HCl to feed of 0.03–0.05, preferably 0.04. The effluent from the hexane isomerization unit 210 is passed through line 212 to coalescer 214 wherein catalyst is separated from hydrocarbon and the catalyst is recycled to reactor 210 through line 216. The hydrocarbon is passed through line 218 to a clay treater 220 for catalyst removal. The clay treater 220 can be regenerated as has been hereinbefore described with reference to vessel 175. The hydrocarbon, now free of catalyst, is passed through line 222 to HCl stripper 224 wherein HCl is removed through line 248 and recycled to the reaction. Further, the overhead stream 226 containing predominantly HCl is condensed in heat exchanger 228 and returned to the stripper as reflux therefor. Hydrocarbon is removed from HCl stripper through line 230 after heater 232 and a portion of the hydrocarbon is recycled to the stripper through line 234 to provide heat therefor. The other portion of the hydrocarbon is passed to hexane splitter 236 wherein isohexane is removed overhead through line 238. A portion of the overhead is passed through line 240 through condenser 242 and refluxed to the hexane splitter 236. The other portion is passed through heat exchanger 244 to condense the same and thereby recover isohexane. Normal hexane is removed from hexane splitter 236 through line 246 and recycled to the isomerization process. Cyclohexane and $C_6+$ hydrocarbons are removed through line 250, reheated in heat exchanger 252 and a portion thereof returned to hexane splitter through line 254. The other portion is passed to fractionator 256 wherein cyclohexane is removed through line 258, condensed in heat exchanger 260 and a portion thereof returned as reflux through line 262. The other portion is removed as product having 98 percent pure cyclohexane through line 264. $C_6$ and heavier hydrocarbons are removed from fractionator 256 through line 66, heated in heat exchanger 268 and a portion thereof returned to fractionator 256 through line 270. The other portion is removed as a product which is useful in motor fuels.

Referring now to FIGURE 3, aluminum chloride complex which is a heavy liquid is passed through line 176a to the top portion of activation unit 188. Hydrogen is passed through line 186 to bottom portion of the reactor 188 which contains a plurality of gas liquid contacting devices between the bottom and top thereof. A portion of the liquid complex is removed through line 280, cooled in heat exchanger 282 and returned through line 284 to the reactor as reflux. Another portion of the liquid is heated in heat exchanger 286 and passed through line 288 at a temperature of about 425° F. back to the portion of the reactor below line 280. As is obvious to one skilled in the art, the hydrogen stream passes upwardly and countercurrently contacts the downwardly flowing aluminum chloride complex. The gas is removed overhead through line 180. The activated catalyst as it reaches the bottom of the reactor is contacted with a quench complex which enters the bottom of the reactor through line 176b. The regenerated complex is removed through line 192. Preferably, the temperature of the reactor is maintained at about 420° F. and the pressure is maintained at about 1000 p.s.i.g. The ratio of hydrogen (SCF) to barrels of complex is about 2500 and the feed temperature is about 100° F.

To further exemplify the invention, a specific example of the invention is represented by the following material balances.

Butane isom. section (4500 b.p.d.) material balance

Charge: Lbs./hr.
Makeup n-Butane _____ 37,395
HCl Charge _____ 15
Effective $AlCl_3$ Chg. _____ 33
Recycle n-Butane _____ 32,550
n-Butane from DIP alkyl _____ 2,385

72,378

Effluent: Lbs./hr.
Isobutane Make _____ 36,165
Recycle n-Butane _____ 32,550
Heavies _____ 3,615
$AlCl_3$ Complex Dump _____ 48

72,378

Dip alkylation section (6000 b.p.d.) material balance

In: Lbs./hr.
Makeup Isobutane _____ 36,165
Ethylene Charge _____ 20,922
HCl Charge _____ 83
Metallic Aluminum _____ 18

57,188

Out:
Alkylate _____ 54,696
Normal Butane Make _____ 2,385
Hydrogen _____ 3
$AlCl_3$ complex _____ 104

57,188

Catalyst activation section material balance

Charge:
Complex _____ 104.0
Hydrogen _____ 3.0

107.0

Effluent:
Regenerated complex (65% $AlCl_3$) _____ 80.0
Off Gas _____ 27.0

107.0

Off gas analysis: Mol percent
$H_2$ _____ 25.4
$C_1$ _____ 27.9
$C_2$ _____ 22.7
$C_3$ _____ 18.7
$C_4$ _____ 4.7
$C_5+$ _____ 0.6

100.0

Benzene hydro. section (5000 b.p.d.) material balance

Charge: Lbs./hr.
Hydrocarbon feed _____ 50,438
Makeup Hydrogen _____ 80
Recycle Hydrogen _____ 1,987

52,505

Effluent:
Charge to Hexane Isom. _____ 50,518
Recycle Hydrogen _____ 1,987

52,505

|  | Feed Analysis | Product Analysis |
| --- | --- | --- |
| 2M pentane | 7.7 | 7.7 |
| 3M pentane | 10.0 | 10.0 |
| n-Hexane | 51.8 | 51.8 |
| MCP | 23.4 | 23.4 |
| Benzene | 4.2 |  |
| 2,4-dimethylpentane | 0.4 | 0.4 |
| Cyclohexane | 2.5 | 6.7 |
|  | 100.0 | 100.0 |

Hexane isom. section (5000 b.p.d.) material balance

In: Lbs./hr.
Charge from Benzene Hydro. _____ 50,518
Makeup Complex _____ 75
Makeup HCl _____ 13

50,606

Hexane isom, section (5000 b.p.d.)
material balance—continued

| Out: | Lbs./hr. |
|---|---|
| Isohexane | 25,158 |
| 85% n-Hexane | 13,028 |
| 98% Cyclohexane | 12,078 |
| $C_6+$ to MTR Fuel | 253 |
| Dump $AlCl_3$ Complex | 89 |
| | 50,606 |

| | Feed Analysis | Effluent Analysis |
|---|---|---|
| 2M pentane | 7.7 | [1] 47.5 |
| 3M pentane | 10.0 | [1] 47.5 |
| n-Hexane | 51.8 | 21.9 |
| MCP | 23.4 | 6.7 |
| 2,4-dimethylpentane | 0.4 | 0.5 |
| Cyclohexane | 6.7 | 23.4 |
| | 100.0 | 100.0 |

[1] $iC_6$.

It has been estimated that for the production of 4,411 barrels per day of butane isomerization product, 5,629 barrels per day of alkylation product and 5,000 barrels per day of hexane isomerization product, the catalyst cost would be $766 per day if the aluminum chloride were not formed in situ. By generating the catalyst from aluminum and HCl for the same production, the catalyst cost would be about $491 per day. However, in areas where HCl is a waste product, the catalyst cost would be about $220 per day.

Whereas the invention has been described with reference to the drawings as the isomerization of normal butane and the alkylation of isobutane together with ethylene to produce diisopropyl, it is obvious that other hydrocarbons and olefins could be used in the process. For example, propylene, butenes, pentenes, etc., could be used as the olefins. Also, pentanes, hexanes, heptanes, etc. could be isomerized and used in the alkylation process.

Reasonable variation and modification are possible within the scope of the foregoing disclosure, the drawings and the claims to the invention without departing from the spirit thereof.

We claim:

1. An integrated alkylation and isomerization process comprising passing aluminum and a hydrogen halide selected from the group consisting of hydrogen chloride and hydrogen bromide to an alkylation zone, passing an olefin and an alkylatable isomerized hydrocarbon from an isomerization zone to said alkylation zone and therein alkylating said alkylatable isomerized hydrocarbon with said olefin under alkylating conditions, forming an aluminum halide-hydrocarbon complex in situ in said alkylation zone, said aluminum halide-hydrocarbon complex catalyzing the alkylation reaction, withdrawing a stream of aluminum halide-hydrocarbon complex from said alkylation zone and passing said aluminum halide-hydrocarbon complex stream to said isomerization zone, the aluminum halide-hydrocarbon complex serving to catalyze isomerization of a hydrocarbon to form said alkylatable isomerized hydrocarbon used in said alkylation zone, removing a stream comprising an alkylated hydrocarbon from said alkylation zone as a product of the process, removing a stream comprising spent aluminum halide-hydrocarbon complex catalyst from said alkylation zone and passing said spent catalyst stream to a catalyst activation zone wherein said spent catalyst is regenerated with the aid of hydrogen, withdrawing a hydrogen stream from said alkylation zone, said hydrogen stream being produced by the formation of said aluminum halide-hydrocarbon complex catalyst, and passing said hydrogen stream to said catalyst activation zone as the regenerating agent therein.

2. A process according to claim 1 wherein a regenerated catalyst stream is withdrawn from said catalyst activation unit and passed to a hexane isomerization zone a hydrogen rich stream is withdrawn from said catalyst activation zone, and passed to a hydrogenation zone wherein a benzene-hexane containing stream is subjected to hydrogenation conditions to hydrogenate said benzene and a hydrogenated benzene-hexane containing stream is passed from said hydrogenation zone to said hexane isomerization zone and therein said hexanes are isomerized.

3. A process according to claim 1 wherein normal butane in said isomerization zone and said olefin in said alkylation zone is ethylene.

4. A process according to claim 2 wherein said aluminum halide formed is aluminum chloride and said hydrogen halide is HCl.

5. A process according to claim 1 wherein isomerizable hydrocarbon is unavoidably produced in said alkylation zone and said isomerizable hydrocarbon is passed to said isomerization zone.

6. A method according to claim 1 wherein a portion of said activated catalyst is passed to said alkylation unit.

7. A process according to claim 1 wherein a portion of said activated catalyst is passed to said isomerization unit.

References Cited

UNITED STATES PATENTS

| 2,286,814 | 6/1942 | Kemp | 260—683.53 |
| 2,316,775 | 4/1943 | Egloff | 260—683.53 |
| 2,330,206 | 9/1943 | Dryer et al. | 260—683.53 |
| 2,355,339 | 8/1944 | Story | 260—683.53 |
| 2,968,684 | 1/1961 | Hepp et al. | 260—683.74 |
| 3,352,941 | 11/1967 | Schoen et al. | 260—683.74 |

DELBERT E. GANTZ, Primary Examiner

G. J. CRASANAKIS, Assistant Examiner

U.S. Cl. X.R.

252—411; 260—683.74, 683.77